US012269675B2

(12) United States Patent
De Vries

(10) Patent No.: US 12,269,675 B2
(45) Date of Patent: Apr. 8, 2025

(54) DEVICE FOR COMPARTMENTALIZING A WASTE CONTAINER

(71) Applicant: Vriflex Holding B.V., Spijk (NL)

(72) Inventor: Patricia Johanna Ingrid De Vries, Spijk (NL)

(73) Assignee: Vriflex Holding B.V., Spijk (NL)

( * ) Notice: Subject to any disclaimer, the term of this patent is extended or adjusted under 35 U.S.C. 154(b) by 0 days.

(21) Appl. No.: 17/797,169

(22) PCT Filed: Jan. 12, 2021

(86) PCT No.: PCT/EP2021/050489

§ 371 (c)(1),
(2) Date: Aug. 3, 2022

(87) PCT Pub. No.: WO2021/160356

PCT Pub. Date: Aug. 19, 2021

(65) Prior Publication Data

US 2023/0059941 A1 Feb. 23, 2023

(30) Foreign Application Priority Data

Feb. 13, 2020 (NL) ...................................... 2024898

(51) Int. Cl.
*B65F 1/06* (2006.01)
*B65F 1/00* (2006.01)

(52) U.S. Cl.
CPC .............. *B65F 1/0046* (2013.01); *B65F 1/06* (2013.01)

(58) Field of Classification Search
CPC .......... B65F 1/06; B65F 1/0046; B65F 1/004; B65F 1/085; B65D 25/04; B65D 3/24
USPC ..... 220/529, 909, 4.01, 528, 404, 533, 4.27; 248/101; 211/184
See application file for complete search history.

(56) References Cited

U.S. PATENT DOCUMENTS

| | | | | |
|---|---|---|---|---|
| 5,193,713 | A * | 3/1993 | Greathouse | B65F 1/06 248/101 |
| 6,024,240 | A * | 2/2000 | Howard | B65F 1/004 220/495.11 |
| 2015/0217934 | A1 * | 8/2015 | Ditzler | B65F 1/1607 206/459.5 |

FOREIGN PATENT DOCUMENTS

| | | | |
|---|---|---|---|
| CN | 108516236 | A | 9/2018 |
| EP | 1 440 917 | A1 | 7/2004 |
| EP | 3 656 701 | A1 | 5/2020 |
| FR | 2 957 064 | A1 | 9/2011 |
| WO | 02/26595 | A1 | 4/2002 |

(Continued)

*Primary Examiner* — Don M Anderson
*Assistant Examiner* — Elizabeth J Volz
(74) *Attorney, Agent, or Firm* — Hoffmann & Baron, LLP

(57) ABSTRACT

A device for compartmentalizing a container, such as a waste bin, into several compartments incudes an attachment which is configured to be attached to an edge of the container, which edge defines an access to a space for holding waste, and a dividing body which is configured, in use, to extend inside the edge of the container in order to divide the access into a first opening of a first compartment and at least one second opening of a second compartment. The dividing body is attachable to the edge of the container by means of the attachment. The dividing body and/or the attachment is at least partly flexible in order to be adjustable between a first, relatively compact, position of the device and at least one further, extended, position of the device.

18 Claims, 8 Drawing Sheets

(56) References Cited

FOREIGN PATENT DOCUMENTS

WO 2015/139124 A1 9/2015

* cited by examiner

DEVICE FOR COMPARTMENTALIZING A WASTE CONTAINER

CROSS-REFERENCE TO RELATED APPLICATIONS

This application is the National Stage of International Application No. PCT/EP2021/050489, filed Jan. 12, 2021, which claims the benefit of Netherlands Application No. 2024898, filed Feb. 13, 2020, the contents of which is incorporated by reference herein.

FIELD OF THE INVENTION

The invention relates to a device for compartmentalizing an internal space of a container. More particularly, the invention relates to a device for compartmentalizing an internal space of a waste container. The invention further relates to a waste assembly for holding multiple different types of waste materials and to a method of installing the inventive device in a container.

STATE OF THE ART

As developments in the field of waste recycling speed up, the need for gathering and collecting items of waste separately increases. Households, among others, are being asked to presort the waste they produce. Usually, different categories of waste, such as paper items, plastic items, glass items and green waste, are collected separately. In many cases, households presort their waste in various waste containers intended for the purpose. Partly due to the increasing number of recycling streams, this quickly leads to an excess of different waste containers, which is particularly inconvenient for households.

There are various commercially available waste containers which aim to save space and whose internal space is divided into several compartments which are separated from one another. Each compartment may then hold a different category of waste.

However, a drawback of such a known waste container is the fact that the compartmentalisation is made to measure for the waste container and is therefore fixed in advance. In addition, this requires the purchase of a new and also relatively expensive waste container, even if an older waste container is not yet due for replacement.

OBJECT OF THE INVENTION

It is an object of the invention to provide a device which provides in a space-efficient waste separation. More particularly, it is an object of the invention to provide compartmentalisation for existing containers in a straightforward and efficient manner.

SUMMARY OF THE INVENTION

To this end, the invention provides a device for compartmentalizing a container, such as a waste bin, into several compartments. The device comprises an attachment means which is configured to be attached to an edge of the container, which edge defines an access opening to a space for holding waste, and a dividing body which is configured, in use, to extend inside the edge of the container in order to divide the access opening into a first opening of a first compartment and at least one second opening of a second compartment. The dividing body is attachable to the edge of the container by means of the attachment means. The device is characterized by the fact that the dividing body and/or the attachment means is at least partly flexible in order to be adjustable between a first, relatively compact, position of the device and at least one further, extended, position of the device.

In this way, a universal compartmentalizing device is obtained which can be adapted to any desired shape and size of container. The device can thus be used with a plurality of different containers.

The attachment means comprises a peripheral element. The peripheral element is configured to be provided, in use, around the access to the container. As a result of the flexibility, the peripheral element is able to assume the shape of the container, for example the shape of the peripheral wall around the access opening of the internal space of the container. Thus, the peripheral element may, for example, assume the shape of a square or circular access opening. In addition, the flexibility of the dividing body and the peripheral element provides a convenient compartmentalizing device which is easy to store.

The length of the peripheral element may be adjustable and/or variable, so that the length of the peripheral element can be adjusted to a peripheral dimension of the container, for example the peripheral dimension of the access opening.

The device compartmentalizes, for example, an internal space of a waste bin, wherein the waste bin comprises a container body with a bottom and a peripheral wall which extends between the bottom and an edge. The bottom and the peripheral wall define an internal space of the waste bin. The edge of the peripheral wall defines an access opening which provides access to the internal space.

The device comprises, for example, a frame, wherein the frame comprises the peripheral element, a junction element and a plurality of dividing bodies, wherein each dividing body of the plurality of dividing bodies extends between a first coupling location where the dividing body is coupled to the central junction element and a second coupling location where the dividing body is coupled to the peripheral element.

The dividing body or, where applicable, each of the plurality of dividing bodies may comprise, for example, dividing strips. In use, the device is configured such that a user can arrange the peripheral element around the access opening of the container, in such a way that the plurality of dividing bodies extend laterally in a plane of the access opening between the junction element which is positioned centrally in the access opening and the peripheral element, and wherein a compartment is defined between each respective pair of adjacent dividing bodies.

The peripheral element and the dividing body are substantially flexible, wherein a periphery of the peripheral element and a length of the dividing body are variable and/or adjustable. In particular, the adjustment of the lengths may be carried out to make a single device suitable for many different containers, e.g. waste bins, each having a respective different perimeter size and/or perimeter shape of its edge.

The peripheral element is at least partly elastic in order to vary the length of the periphery of the peripheral element. The peripheral element may be expanded in order to be fitted around a periphery of the edge of the peripheral wall of the container. In this case, the elasticity of the peripheral element may provide a clamping force between the peripheral edge and the container so that the device is fixed with respect to the container. It is for example possible for a part of a rubbish bag to be fitted between the peripheral element and the container. The elasticity of the peripheral element may in addition compensate for any discrepancy between a set length of the peripheral element and a length of the periphery of the access opening of the container.

The dividing body is at least partly elastic in order to vary the length of the dividing body. The dividing bodies can thus be tensioned in the plane of the access opening.

Adjusting the length of the peripheral element and/or the dividing body may be carried out before the device is fitted to a container in order to be adapted to a size of the container, in particular a size of the access opening. Adjusting the peripheral element and/or the dividing body may take place independently of each other. Fitting the device to a container, such as a waste container, is then facilitated by the fact that the peripheral element and the dividing body may vary in length and can thus compensate for any discrepancies between the lengths of the dividing body and peripheral element on the one hand and the sizes of the container on the other hand.

In one embodiment, the peripheral element, comprises an adjustment means, such as an adjustment fastening, for adjusting the periphery of the peripheral element between a first peripheral dimension and a second, larger peripheral dimension. The peripheral element may for example be configured so as to be adjustable between 3 different periphery sizes, such as between S/M/L. In this way, the peripheral dimension of the peripheral element may be adjusted to a size of the container, for example before fitting the compartmentalizing device to the container, in particular to a length of the periphery of the access opening. An adjustment fastening may be provided for readily adjusting and fitting the peripheral element around the periphery opening. The adjustment element may form, for example, an adjustable coupling between two ends of the peripheral element in order thus to form a loop which can easily be fitted around the access opening of the container. Preferably, the ends of the peripheral element can easily be uncoupled in order to remove the compartmentalizing device from the container. The adjustment fastening may comprise, for example, a hook and loop fastener which couples two opposite ends of the peripheral element to each other.

The length of the peripheral element may be adjusted between the periphery sizes in steps with the adjustment means. In addition, the length of the peripheral element may be varied in each of the adjusted periphery sizes. For example, the peripheral element may be set to size M, in which case it is possible to vary the length of peripheral element, for example by means of the elasticity of the peripheral element.

In an embodiment, the peripheral element comprises an elastic belt, which is configured to be clamped elastically around the access to the container. This elastic belt is configured to be stretched elastically by a user during attachment around the container, and configured to contract afterwards. A remaining amount of elastic energy may remain present in the elastic belt after attachment to the container, to effect that the elastic belt is clamped around the circumference of the container, without requiring any additional fastening means.

In an embodiment, the peripheral element comprises a contact surface that is, in use, configured to contact the wall of the container, wherein this contact surface is provided as an anti-slip contact surface, for example comprising an anti-slip material like natural rubber or synthetic rubber. The anti-slip contact surface may provide for an increased grip of the peripheral element onto the wall of the container, to improve the strength of the clamped connection between the peripheral element and the container.

In an embodiment, the device further comprises a connecting means for connecting one or more rubbish bags to the device. With the connecting means, the one or more rubbish bags may be held in place in the respective compartments of the container, as defined by device. Accordingly, the rubbish bag may be held open by the device so that their respective interiors are accessible through the openings defined by the device.

In a further embodiment, the connecting means comprises a clamping strip, which is, in use, arranged around the elastic belt. The clamping strip is configured to clamp the one or more rubbish bags against the container. The clamping strip may be a substantially elastic and/or adjustable clamping strip, which clamping strip is configured, in use, to be provided around the access opening for clamping at least a part of the bag between the clamping strip and the container body.

The clamping strip may be stretched slightly when arranged around the container, so that the elastic energy contained therein will effect clamping of the rubbish bags. In fact, the rubbish bags may become clamped in between the clamping strip and the elastic belt with which the device is clamped around the container during use.

The clamping strip may also be provided as a separate body, which has the benefit of being releasable from the rest of the device, so that the remainder of the device, e.g. the peripheral element and the dividing bodies, can stay in place on the container. This may allow for convenient replacement of a single rubbish bag, whilst leaving the other rubbish bags and the remainder of the device in place.

Alternatively, however, the clamping strip may be connected to the device, for example being connected to the peripheral element.

In an embodiment, the clamping strip comprises a contact surface that is, in use, configured to contact the rubbish bags, wherein this contact surface is provided as an anti-slip contact surface as well, for example comprising an anti-slip material like natural rubber or synthetic rubber. The anti-slip contact surface of the clamping strip may provide for an increased grip of the clamping strip onto the wall of the rubbish bags, to improve the strength of the clamped connection between the clamping strip and the rubbish bags.

In an embodiment, the clamping strip comprises an strip adjustment means, such as an strip adjustment fastening, for adjusting the periphery of the clamping strip between a first clamping strip dimension and a second, larger clamping strip dimension. The clamping strip may for example be configured so as to be adjustable between 3 different periphery sizes, such as between S/M/L. In this way, the clamping strip dimension of the clamping strip may be adjusted to a size of the container, for example before inserting the rubbish bags in the compartments of the container, in particular to a length of the periphery of the access opening. A strip adjustment fastening may be provided for readily adjusting and fitting the clamping strip around the rubbish bags. The strip adjustment element may form, for example, an adjustable coupling between two ends of the clamping strip in order thus to form a loop which can easily be fitted around the rubbish nags and the container. The strip adjustment fastening may comprise, for example, a hook and loop fastener which couples two opposite ends of the clamping strip to each other.

The length of the peripheral element may be adjusted between the periphery sizes in steps with the adjustment means. In addition, the length of the peripheral element may be varied in each of the adjusted periphery sizes. For example, the peripheral element may be set to size M, in which case it is possible to vary the length of peripheral element, for example by means of the elasticity of the peripheral element.

In one embodiment, the device comprises a central junction element. The device may furthermore comprise a plurality of dividing bodies, wherein each dividing body of the plurality of dividing bodies extends between a first coupling location where the dividing body is coupled to the central junction element and a second coupling location where the dividing body is coupled to the peripheral element. The length of each dividing body may be adjustable and/or variable, as a result of which a length of each dividing body can be adjusted to a size of the access opening, so that the central junction element may be provided at least virtually centrally in the access opening and the dividing body can extend laterally between the central junction element and the peripheral element in the plane of the access opening and can thus provide in compartmentalisation of the container.

In one embodiment, each dividing body of the plurality of dividing bodies comprises an adjustment means, such as an adjustment fastening, for adjusting the length of the dividing body between a first length dimension and a second, larger length dimension. A dividing body may be configured, for example, so as to be adjustable between 3 different length dimensions, such as between S/M/L, independently of the peripheral element. In this way, the lengths of the dividing body can be adjusted to a size of the access opening. An adjustment fastening may be provided for easily adjusting the dividing body. By means of the adjustment fastenings of the dividing body, the central junction element can be positioned centrally in the plane of the access opening.

The length of each of the dividing bodies may be adjusted independently of the other dividing bodies. The dividing bodies may be adjusted, for example, in steps between the different length dimensions. In addition, the length of each dividing body may be varied in each of the adjusted length dimensions. For example, a dividing body may be set to size M, in which case it is possible to vary the length of the dividing body in size M, for example by means of the elasticity of the dividing body, in order to tension the dividing body in the plane of the access opening. The dividing body may be configured, for example, as a dividing strip.

In one embodiment, the second coupling location of each of the dividing bodies along the peripheral element is adjustable. The coupling location may be adjusted, for example, by means of a second slidable coupling. In this way, the sizes of the compartments, in particular the disposal openings of each compartment, with respect to each other may be set. The spaces between the dividing bodies may be increased or decreased, for example. The second slidable coupling may comprise, for example, a loop, wherein the loop is formed by an end of the dividing body, and wherein a part of the peripheral element is provided by an opening of the loop.

In a further embodiment, each of the dividing bodies comprises a second slidable coupling, which is connected to the peripheral element at the second coupling location, wherein each second slidable coupling comprises an engagement part, e.g. an engagement loop integral with the dividing body, that is preferably made from elastic material, and wherein the peripheral element extends through each of the engagement parts. Each of the dividing bodies is thereby interlocked with the peripheral element in a direction perpendicular to the peripheral element, e.g. in a radial direction, but remains slidable with respect to the peripheral element in a direction parallel to the peripheral element, e.g. in a tangential direction. Furthermore, the clamping strip of the device may also extend through the engagement parts of the dividing bodies.

In a further embodiment, each dividing body may comprise multiple engagement parts, which are arranged next to each other over the length of each dividing body. A user may select an engagement part of each dividing body for inserting the peripheral element. The multiple engagement parts thereby act as adjustment means for the dividing bodies, since each set of engagement parts will result in a different perimeter of the device.

If the peripheral element were to be arranged through the inner-most engagement parts of each dividing body, the resulting device will have a relatively small size. If, on the other hand, the peripheral element were to be arranged through the outer-most engagement parts of each dividing body, the resulting device will have a relatively large size.

In one embodiment, the central junction element comprises a ring structure, wherein each of the plurality of dividing bodies is coupled to the ring structure of the central junction element at the first coupling location. The dividing bodies may be coupled to the ring structure in a simple and compact manner, wherein the first coupling locations are provided around the ring structure. In use, the dividing bodies extend laterally from the first coupling locations in the plane of the access opening.

In one embodiment, the first coupling location is adjustable along the ring structure. This makes it possible, for example, to increase or decrease the space between the dividing bodies.

In a further embodiment, each of the dividing bodies comprises a first slidable coupling, which is connected to the ring structure at the first coupling location, wherein each first slidable coupling comprises a loop that is preferably made from elastic material, and wherein the ring structure extends through each of the loops. Each of the dividing bodies is thereby interlocked with the ring structure in a direction perpendicular to the ring structure, e.g. in a radial direction, but remains slidable with respect to the ring structure in a direction parallel to the ring structure e.g. in a tangential direction.

In one embodiment, the ring structure comprises a first rigid ring element and a second elastic ring element which is positioned, for example concentrically, inside the first rigid ring element, wherein each of the plurality of dividing bodies is coupled to the first rigid ring element and to the second elastic ring element at the first coupling location, for example by means of the first slidable coupling. A part of a bag, for example a rubbish bag, may be provided between the first rigid ring element and the second elastic ring element, wherein tensioning the dividing body comprises expanding the second elastic ring element and thus creating a clamping force between the first and second ring element by means of which the part of the bag can be securely clamped. A part of a rubbish bag may, for example, in use, be fitted in a space between the first and second ring element from a side of the ring structure facing the internal space of the container, in such a manner that one end of the part of the bag protrudes at an opposite side of the ring structure. Subsequently, said protruding part of the bag may be passed through an opening of the second elastic ring structure in order to thus be hidden away in a satisfactory manner.

In a further embodiment, the first rigid ring element and the second elastic ring element extend through each of the loops. In this way, the second elastic ring element is expanded towards the first rigid ring element by all of the dividing bodies, so that all rubbish bags in each of the respective compartments can be clamped securely.

In one embodiment, the device comprises a plug element, which plug element is configured to be fitted, in use, through the ring structure of the junction element, and wherein a periphery of the plug element substantially corresponds to a periphery of the ring structure. A part of a rubbish bag may, for example, be clamped between the plug element and the ring structure. In addition, the plug element may be provided with a lid in order to close an opening in the ring structure, as a result of which no rubbish can fall into the opening without being collected in one of the compartments. Furthermore, any parts of the rubbish bags that protrude through the ring structure may be hidden away by the plug element in a satisfactory manner.

In particular, the periphery of the plug element is larger than the periphery of the second elastic ring element. In this way, the second elastic ring element is stretched slightly upon insertion of the plug element, to ensure proper clamping of the plug element by the second elastic ring element. Moreover, the rubbish bags can be clamped in between the plug element and the second elastic ring element as well with the periphery of the plug element being somewhat larger than the periphery of the second elastic ring element.

In one embodiment, the device comprises an odorizing element, wherein the odorizing element is provided in and/or on the plug element. This makes it possible to mask undesirable odours, in particular those from waste. The odorizing element may be provided in a space of the plug element, wherein openings are provided in order to bring the space in gas communication with an environment of the plug element.

In one embodiment, the device comprises an indicator for indicating the respective compartments. This makes it easy for a user to distinguish the compartments from one another, as a result of which different items end up in the compartments intended therefor. The indicator comprises, for example, a colour indication comprising several colours, wherein each colour indicates a respective compartment. Alternatively or additionally, the indicator comprises an indication in the form of letters and/or numbers. The indicator may be provided, for example, on the central junction element and/or on the lid of the plug element. In the latter, the indicator may, in use, be arranged at a top surface of the plug element.

The present invention further provides a waste assembly for holding multiple different types of waste materials. The assembly comprises a container, such as a waste bin, wherein the container comprises a container body with a bottom and a peripheral wall which extends between the bottom and an edge. The bottom and the peripheral wall define an internal space of the container for holding waste, wherein the edge of the peripheral wall defines an access opening which gives access to the internal space. The assembly furthermore comprises a device as described herein, wherein the peripheral element is provided, e.g. clamped, around the access opening of the container, and wherein the dividing body extends inside the access opening of the container in order to divide the access opening into a first opening of a first compartment and at least one second opening of a second compartment.

Preferably, the plurality of dividing bodies extend laterally in a plane of the access opening between the junction element which is centrally positioned in the access opening and the peripheral element. Between each pair of adjacent dividing bodies one compartment is defined, respectively.

In an embodiment of the assembly, the assembly furthermore comprises at least one bag, preferably a flexible bag, such as a rubbish bag, wherein, in use, the at least one bag is provided in one of the compartments, and wherein the bag, on an open side thereof, is connected to the device, e.g. to the frame of the device, and/or to the container body.

The present invention also provides a method of installing a device for compartmentalizing a container, for example a device as described herein, comprising an at least partly elastic peripheral element and a plurality of at least partly elastic dividing bodies, in a container, e.g. in a waste bin, comprising the steps of:

- setting a perimeter of the peripheral element to correspond to a perimeter of an edge of the container, which edge defines an access to a space for holding waste,
- attaching the peripheral element of the device around the access to the container, and
- adjusting positons of respective coupling locations between each of the dividing bodies and the peripheral element to obtain respective openings to compartments in the container, defined by the dividing bodies and the edge of the container.

In this way, container with a universal compartmentalizing device is obtained which can be adapted to any desired shape and size of container. The device can thus be used with a plurality of different containers.

BRIEF DESCRIPTION OF DRAWINGS

The invention will be explained in more detail below by means of the drawings, in which.

It should be noted that the figures only show illustrations of a preferred embodiment of the invention and that these are given by way of a non-limiting exemplary embodiment. In particular, some parts and dimensions may have been exaggerated to a greater or lesser degree for the sake of clarity.

DETAILED DESCRIPTION OF THE INVENTION

Figure 1:
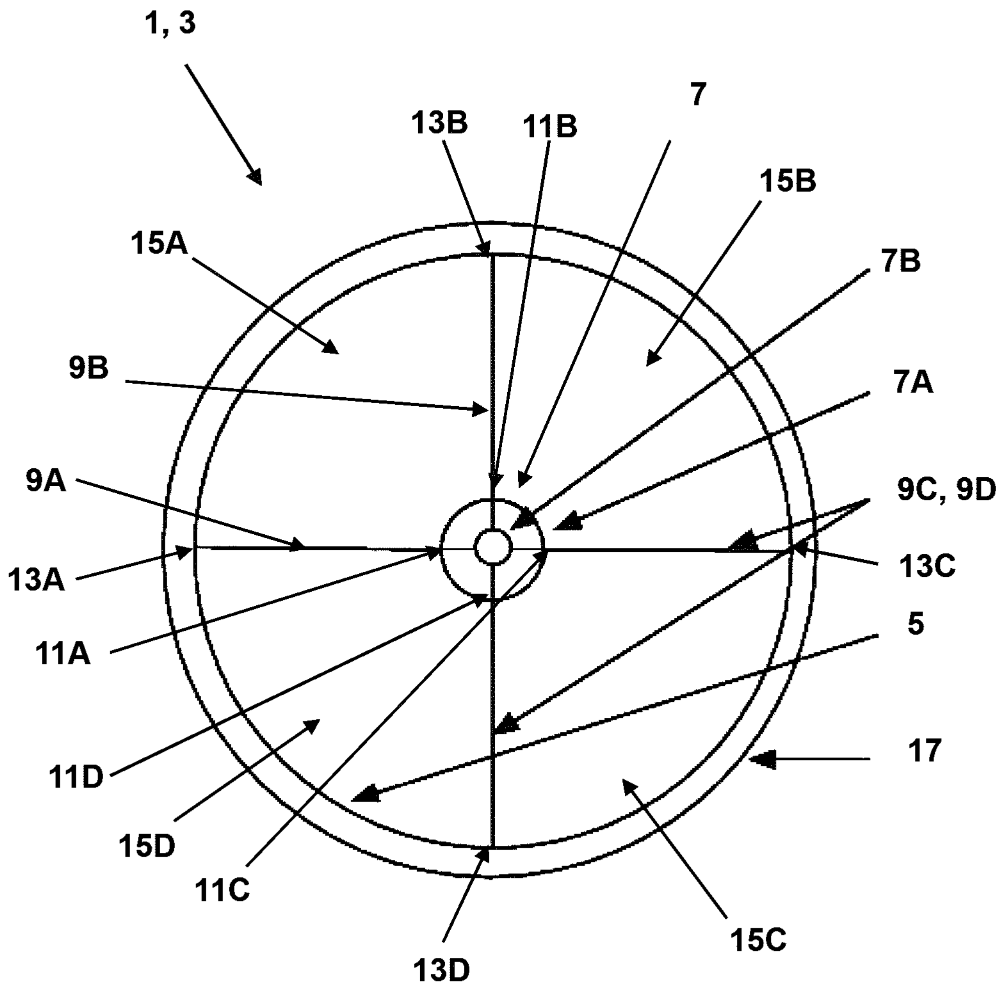
FIG. 1 shows a diagrammatic top view of an embodiment of the device.

FIG. 1 shows a diagrammatic top view of one embodiment of a compartmentalizing device 1 according to the invention. The device 1 comprises a frame 3, which frame 3 comprises a peripheral element 5. The peripheral element 5 may be a peripheral strip which is substantially flexible and is configured to be provided around an access opening of a container. Here, the peripheral element 5 is shown as being circular to illustrate how the peripheral element may be fitted around a circular access opening of a container, but it will be clear that the shape of the peripheral element 5 adapts to the shape of the access opening of a container. Furthermore, the frame 3 of the device 1 comprises a central junction element 7 which is provided centrally inside the peripheral element. The peripheral element 5 comprises a ring structure comprising a first rigid ring element 7A and a second elastic ring element 7B. The second elastic ring element 7B is concentrically positioned inside the first rigid ring element 7A.

A plurality of dividing bodies 9A, 9B, 9C, 9D extend between the central junction element 7 and the peripheral element 5, wherein each of the dividing bodies 9A, 9B, 9C, 9D is coupled to the central junction element 7 at a first respective coupling location 11A, 11B, 11C, 11D. On an opposite side of the dividing body 9A, 9B, 9C, 9D, each of the dividing bodies 9A, 9B, 9C, 9D is coupled to the peripheral element 5 at a second respective coupling location 13A, 13B, 13C, 13D.

FIG. 1 shows four dividing bodies 9A, 9B, 9C, 9D, but it will be clear that the device 1 may comprise more than four dividing bodies, such as five, six or seven dividing bodies, or fewer than four dividing bodies, such as three or two dividing bodies. The dividing bodies ensure that the access opening of the container is divided into a number of compartments, where a respective compartment 15A, 15B, 15C, 15D is defined between each pair of adjacent dividing bodies 9A, 9B, 9C, 9D. Each compartment 15A, 15B, 15C, 15D may be provided with a rubbish bag, for example, for receiving rubbish.

The peripheral element 5 and the dividing bodies 9A, 9B, 9C, 9D are flexible and adjustable in length and variable in length. In particular, the peripheral element 5 and the dividing body 9A, 9B, 9C, 9D are made of an elastic material, as a result of which they are variable. The adjustability is provided by an adjustment fastening, for example a hook and loop fastener, as a result of which the peripheral element 5 and the dividing body 9A, 9B, 9C, 9D can be adjusted between a number of sizes, such as S/M/L.

Furthermore, the device 1 comprises a clamping strip 17 which is provided separately from the rest of the device 1. The clamping strip 17 is elastic and is configured to be provided on an outer side of the container around the access opening in order to clamp a part of a rubbish bag between the clamping strip 17 and the container.

Figure 2:
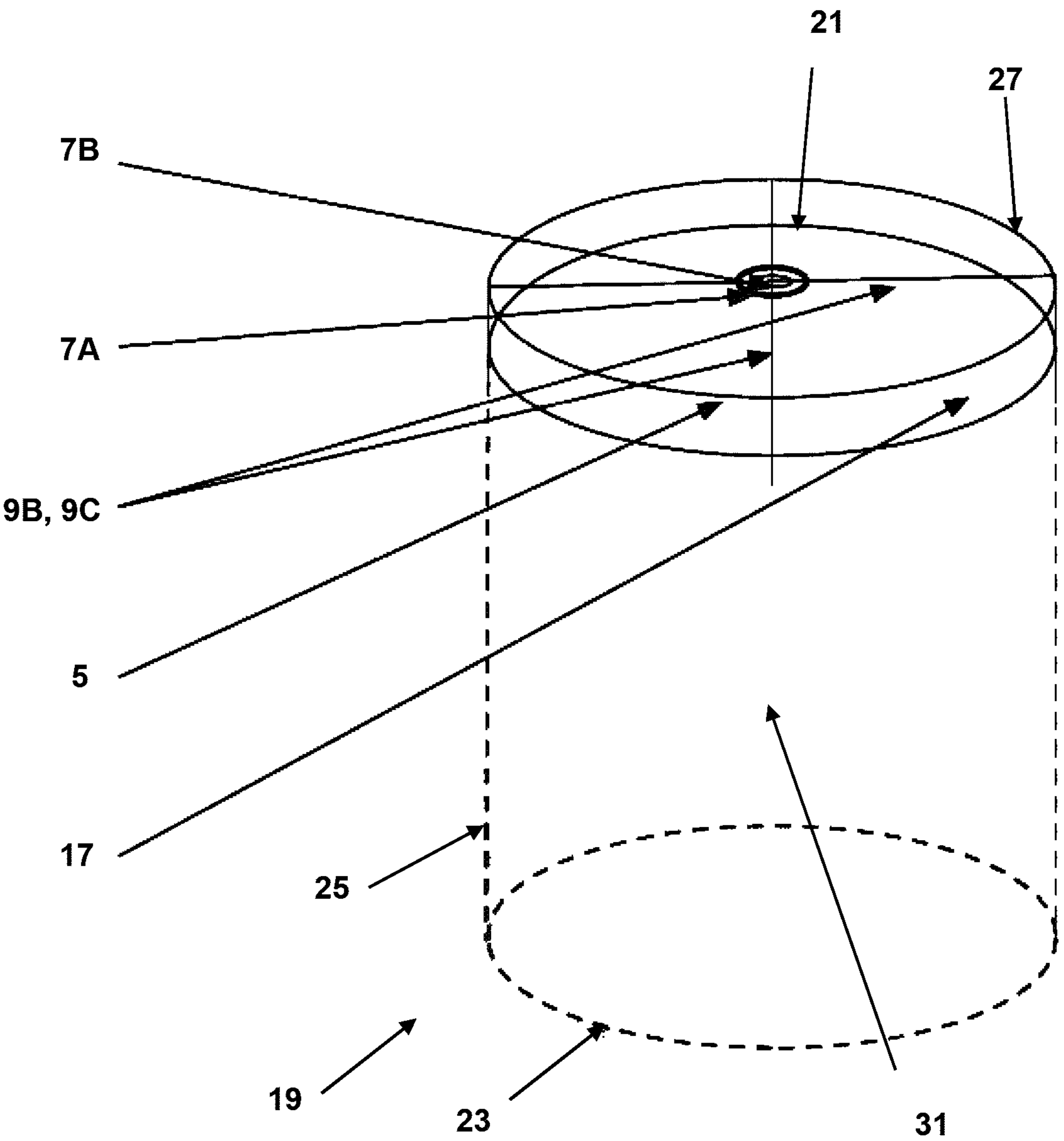
FIG. 2 shows a diagrammatic perspective view of an embodiment of the device.

FIG. 2 shows a diagrammatic perspective view of the compartmentalizing device 1 from FIG. 1, wherein the device 1 is fitted to a container 19. The container 19 is illustrated in a broken line in FIG. 2 and, in this example, has a cylindrical shape with a round access opening 21. The container 19 comprises a container body with a bottom 23 and a peripheral wall 25 which extends between the bottom 23 and an edge 27. The bottom 23 and the peripheral wall 25 define an internal space 31 of the container. The edge 27 of the peripheral wall 25 defines the access opening 21 which provides access to the internal space 31.

Figure 3:
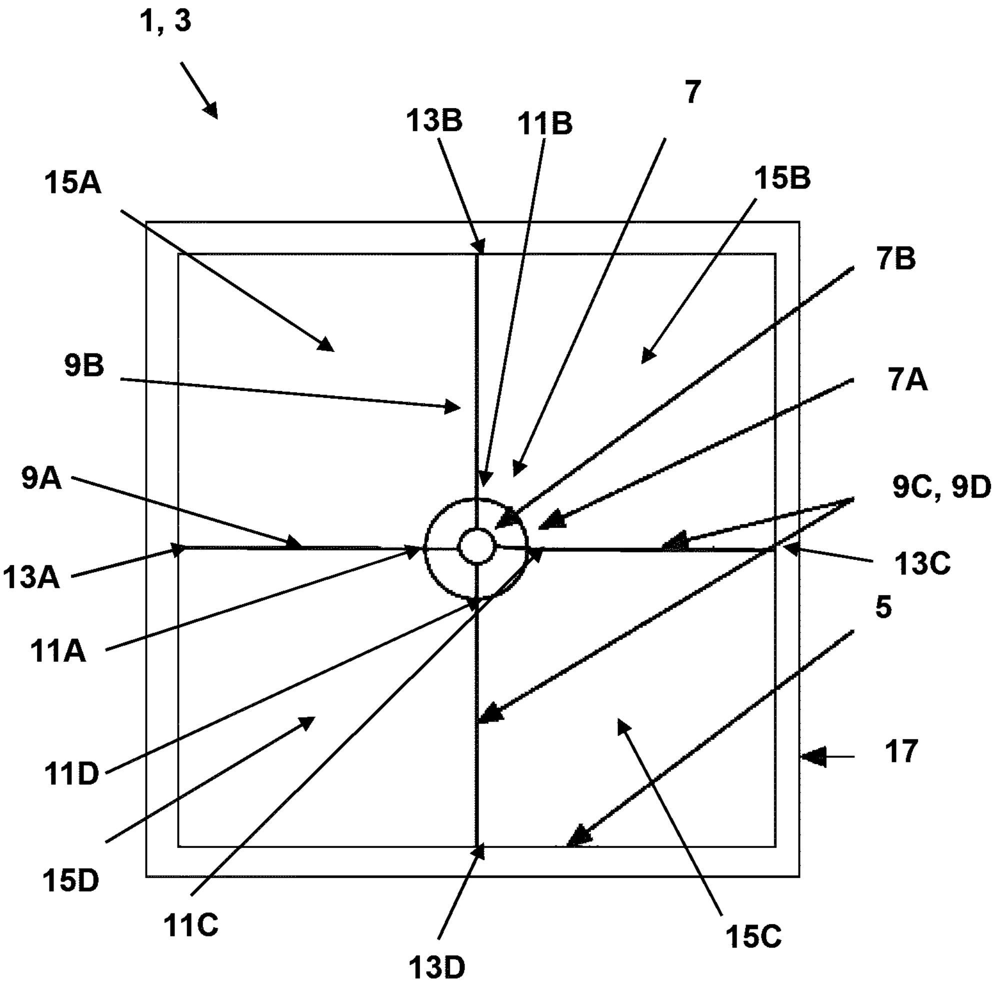
FIG. 3 shows a diagrammatic top view of an embodiment of the device.

FIG. 3 shows a diagrammatic top view of an embodiment of a compartmentalizing device 1 according to the invention, wherein the peripheral element 5 is provided around a square access opening of a container.

Figure 4:
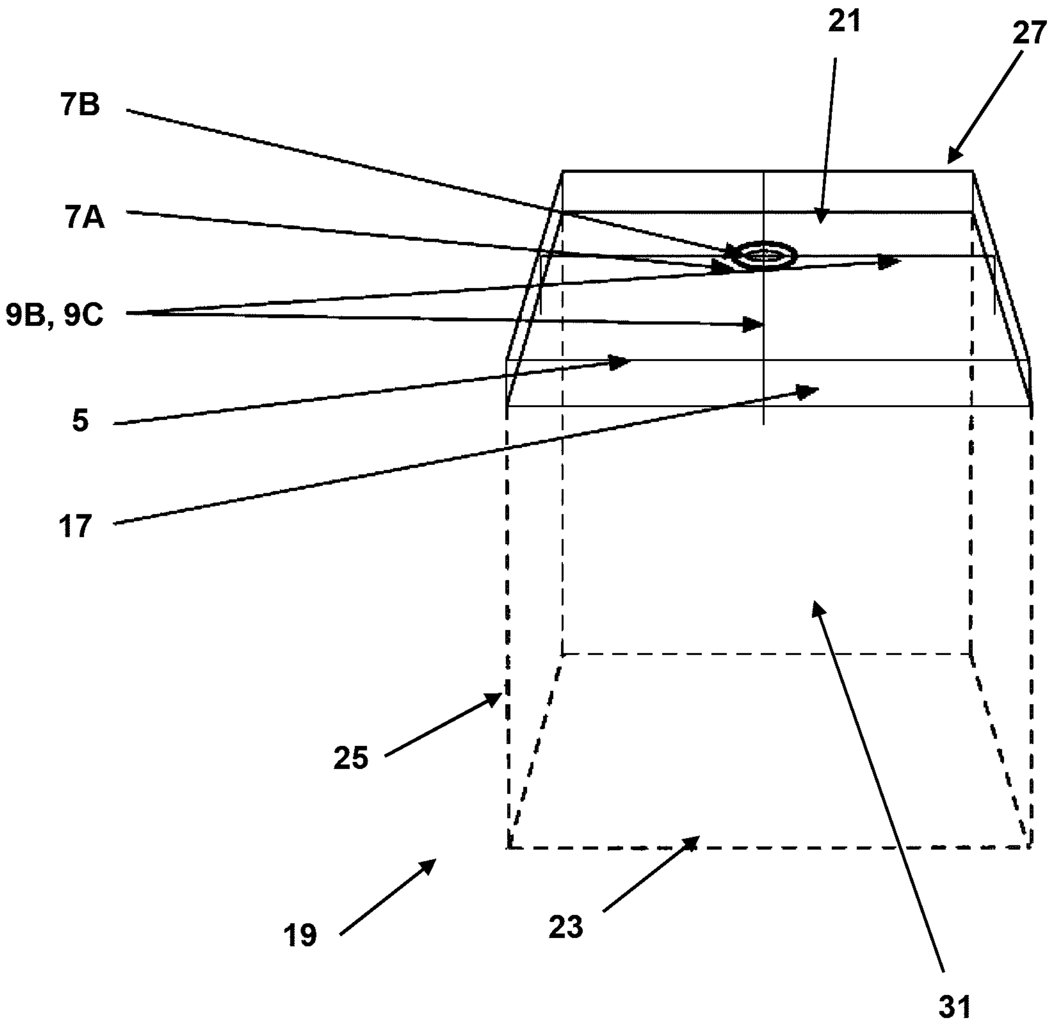
FIG. 4 shows a diagrammatic perspective view of an embodiment of the device.

FIG. 4 shows a diagrammatic perspective view of the compartmentalizing device 1 from FIG. 3, wherein the device 1 is fitted to a container 19. The container 19 is illustrated in a broken line in FIG. 4 and, in this example, has a square access opening 21.

Figure 5:
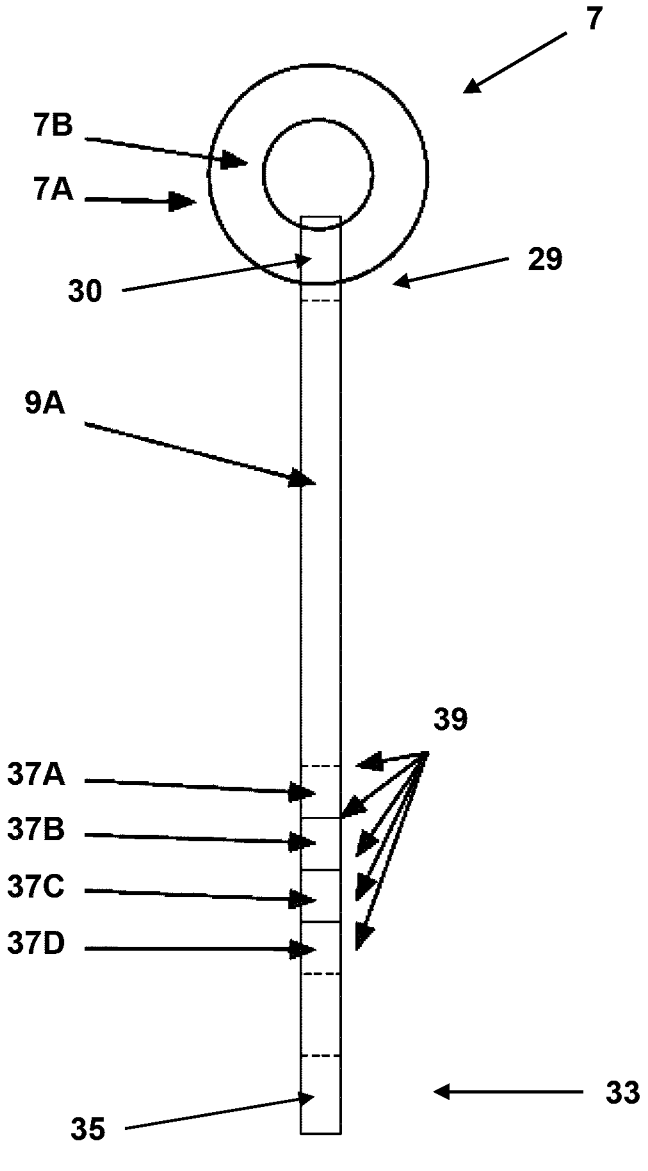
FIG. 5 shows a diagrammatic view of a dividing body.

FIG. 5 shows a diagrammatic illustration of a single dividing body 9A of the plurality of dividing bodies 9. At a first end 29, the dividing body 9A is coupled to the central junction element 7, in this case to an outer ring element 7A and an inner ring element 7B which is concentrically positioned therein. Here, the inner ring element 7B is elastic and the outer ring element 7A is rigid. At the first end 29, the dividing body 9A is coupled by means of a slidable coupling, here a loop 30 in which both the inner ring element 7B and outer ring element 7A are provided by the loop 30. The loop 30 is slidable along a periphery of the ring elements 7A,7B so that it can assume a desired position. The dividing body 9A may be releasably coupled to the central junction element 7, for example by means of a loop and hook coupling. A part of a rubbish bag may be arranged in the space between the inner ring element 7B and the rigid outer ring element 7A, as a result of which the inner ring element is stretched when the dividing body 9 is tensioned in the plane of the access opening and clamps the part of the rubbish bag between the ring elements in the process. As a result thereof, the part of the rubbish bag can be fixed to the central junction element 7 centrally in the access opening of the container in a simple manner.

A second end 33 of the dividing body 9A situated opposite the first end 29 may be coupled to a peripheral element 5, such as a peripheral strip, of the compartmentalizing device. A loop may be or have been provided at the second end 33. In particular, it is possible to form a loop by means of the second end 33. The peripheral element, such as a peripheral strip, may be passed through the opening of the loop, as a result of which a slidable coupling may be produced. The second end 33 may be displaced along the periphery of the peripheral element 5 in such a way that a space of a desired size can be set between adjacent dividing bodies 9. The length of the dividing body 9A is adjustable between several length dimensions. In this example, the dividing body 9A is adjustable between four length dimensions, i.e. S, M, L, and XL. The length of the dividing body 9A can be adjusted to suit a radius of the access opening, in which the dividing body 9A may be arranged. The adjustability of the length of the dividing body 9A may be achieved by means of a releasable fastening, such as a hook and loop fastener. An end part 35 of the dividing body 9A may be, for example, folded back and engage with a plurality of engagement parts 37A, 37B, 37C, 37D, which engagement parts 37A, 37B, 37C, 37D correspond with the length dimensions S, M, L and XL of the dividing body 9A. The dividing body 9A is thus for example set to size S, when the end part 35 and the engagement part 37A engage each other. In this case, the length adjustability of the dividing body 9A is stepped, that is to say discontinuous. This facilitates adjusting the plurality of dividing bodies 9 to the same size. In addition, with a symmetrical access opening, it is simple to achieve a centred positioning of the central junction element 7, virtually in the centre, in the plane of the access opening. To this end, interruptions 39 are provided between the engagement parts 37A, 37B, 37C, 37D, for example a number of stitches.

Figure 6A:
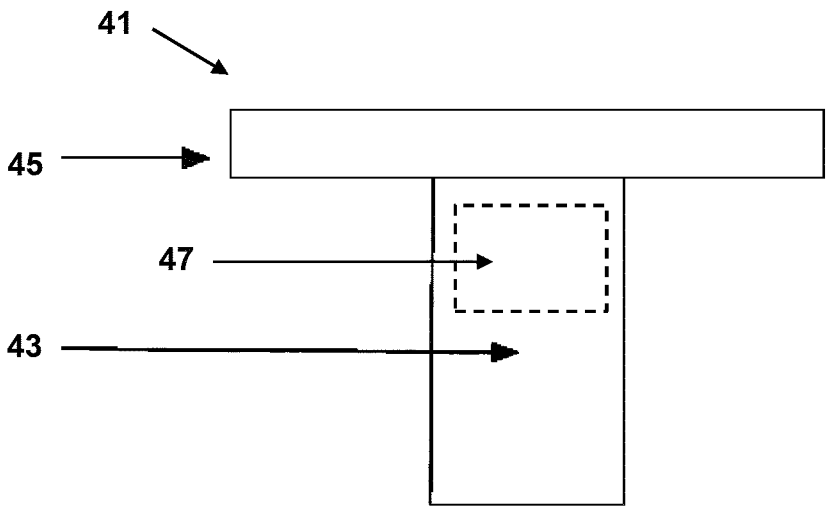
FIG. 6A shows a diagrammatic side view of a plug element.
Figure 6B:
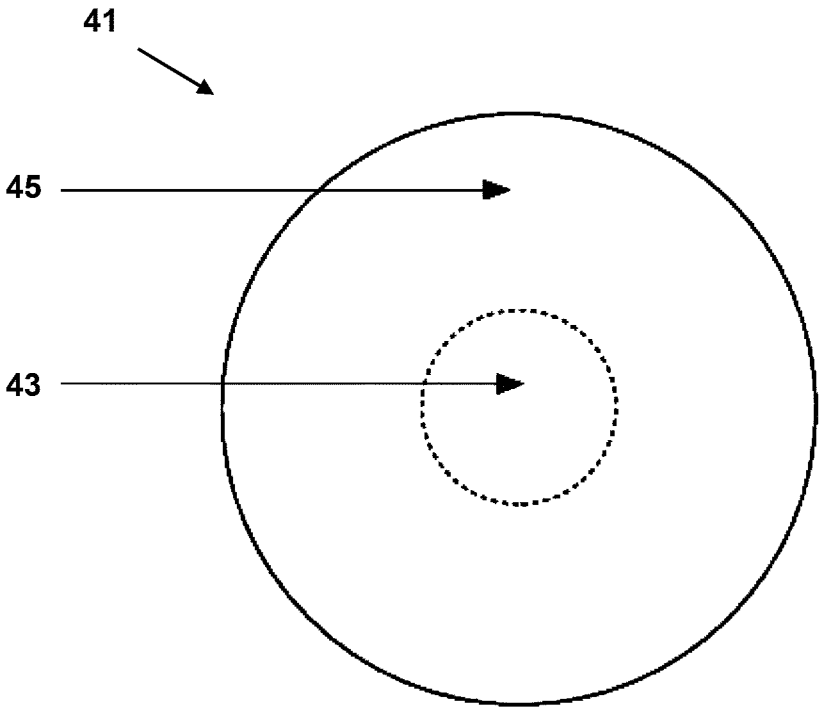
FIG. 6B shows a diagrammatic top view of the plug element.

FIGS. 6A and 6B show a diagrammatic side view and top view of a plug element 41, respectively. The plug element 41 comprises a base 43 and a lid 45. The base 43 may be fitted through an opening in the central junction element 7 in order to securely clamp a part of a rubbish bag. A space 47 may be provided in the base 43 to accommodate an odorizing element. The space may be in open communication with an environment of the device, so that an odour from the odorizing element can spread and drive out and/or mask any unpleasant smells from the rubbish.

Figure 7:
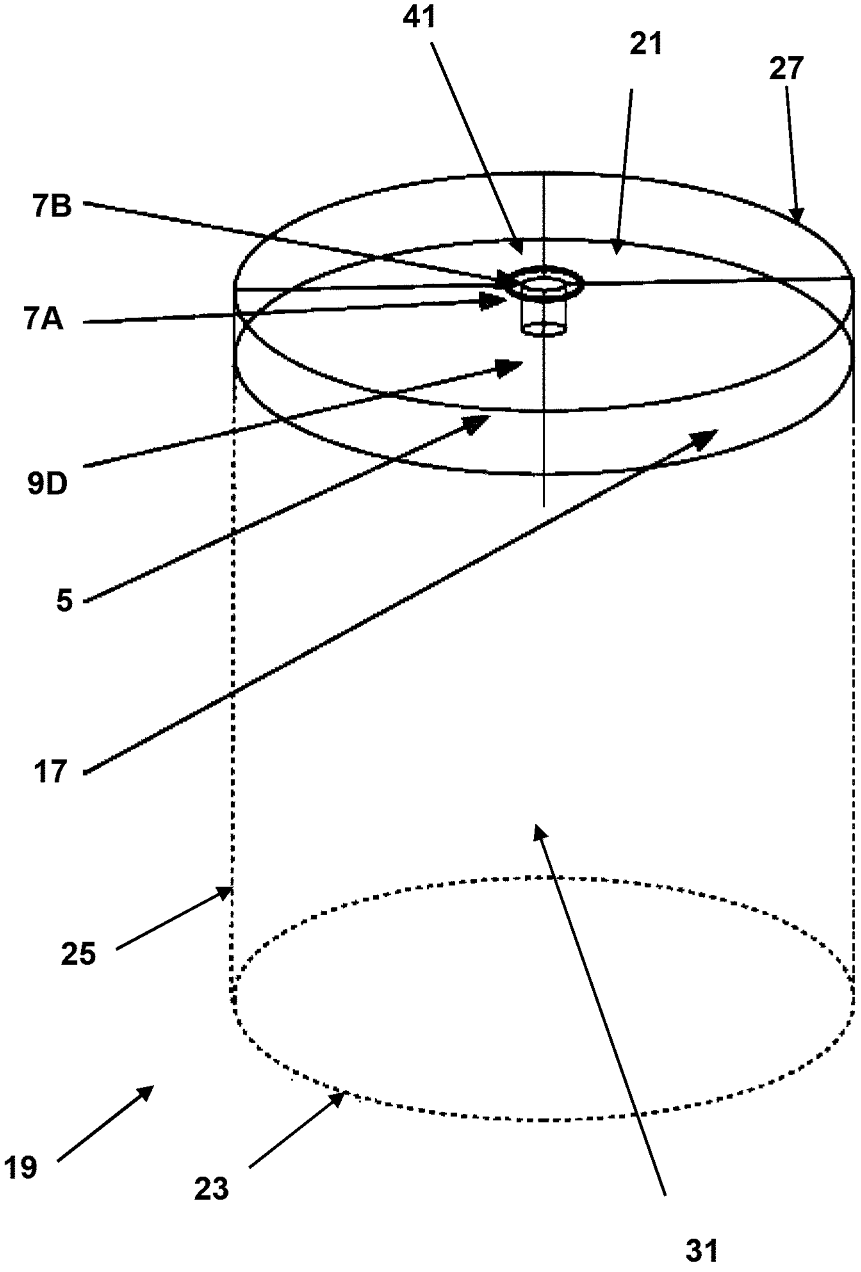
FIG. 7 shows a diagrammatic perspective view of an embodiment of the device.

FIG. 7 shows a diagrammatic perspective view of the compartmentalizing device 1 provided on a container 19 as illustrated in FIG. 2, wherein the plug element 41 as illustrated in FIG. 6A, 6B is fitted through a central opening in the central junction element 7.

Figure 8:
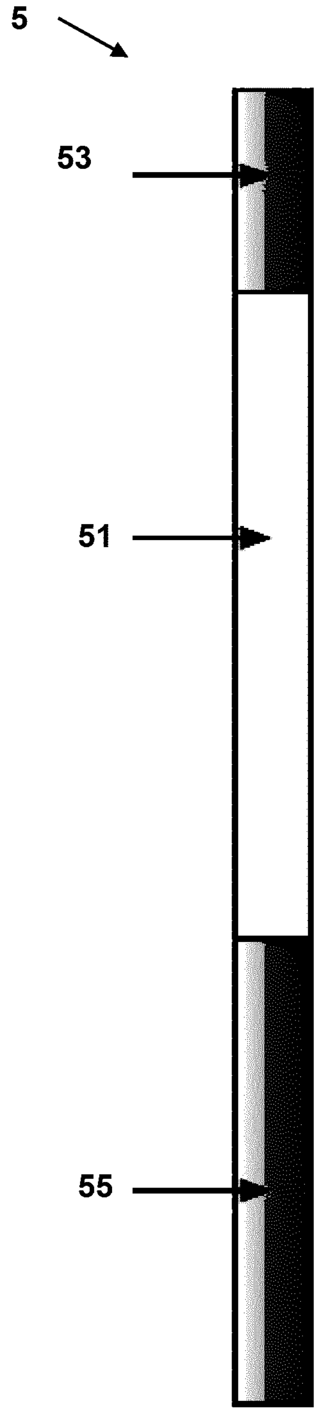
FIG. 8 shows a diagrammatic view of a peripheral element and a clamping strip.

FIG. 8 shows a diagrammatic view of a peripheral element 5. The peripheral element 5, here a peripheral strip, may be of an identical design as the clamping strip 17. The peripheral element 5 comprises an elastic middle part 51 for varying a length of the peripheral element 5 and clamping strip 17. Two opposite ends of the peripheral element 5 can be coupled to each other in order to form a loop which may be fitted around an access opening 21 of a container 19. The coupling between the ends may be brought about by means of engagement zones 53 and 55 of the peripheral element 5, which engagement zones are provided on respective ends of the peripheral element 5. In this case, the engagement zones 53 and 55 are designed as complementary loop and hook fastener zones which can engage with each other, as a result of which the coupling can be brought about in a simple manner when fitting the peripheral strip 5 around an access opening 21 of a container 19, and can also be released in a simple manner when removing the peripheral strip 5. The length of the peripheral element 5 is adjustable between several length dimensions by coupling the engagement parts 53 and 55 at different locations of the engagement zones 53 and 55.

The present invention is further illustrated by means of the following embodiments:

Embodiment 1

Device for compartmentalizing a container, such as a waste bin, into several waste compartments, comprising an attachment means which is configured to be attached to an edge of the container, which edge defines an access to a space for holding waste, and a dividing body which is configured, in use, to extend inside the edge of the container in order to divide the access into a first opening of a first compartment and at least one second opening of a second compartment, wherein the dividing body is attachable to the edge of the container by means of the attachment means, characterized in that the dividing body and/or the attachment means is at least partly flexible in order to be adjustable between a first, relatively compact, position of the device and at least one further, extended, position of the device.

Embodiment 2

Device according to embodiment 1, wherein the attachment means comprises a peripheral element, which peripheral element is configured to be provided, in use, around the access to the container.

Embodiment 3

Device according to embodiment 1 or 2, wherein the device comprises a central junction element and a plurality of dividing bodies, wherein each dividing body of the plurality of dividing bodies extends between a first coupling location where the dividing body is coupled to the central junction element and a second coupling location where the dividing body is coupled to the attachment means.

Embodiment 4

Device according to embodiment 2 or 3, wherein the peripheral element is at least partly elastic in order to vary the length of the periphery of the peripheral element.

Embodiment 5

Device according to one of embodiments 2-4, wherein the peripheral element comprises an adjustment means, such as an adjustment fastening, for adjusting the periphery of the peripheral element between a first peripheral dimension and a second, larger peripheral dimension.

Embodiment 6

Device according to one of the preceding embodiments, wherein the dividing body is at least partly elastic in order to vary a length of the dividing body.

Embodiment 7

Device according to one of the preceding embodiments, wherein the dividing body comprises an adjustment means, such as an adjustment fastening, for adjusting the length of the dividing body between a first length dimension and a second, larger length dimension.

Embodiment 8

Device according to one of embodiments 3-7, wherein the second coupling location is adjustable along the peripheral element, for example by means of a second slidable coupling.

Embodiment 9

Device according to one of embodiments 3-8, the central junction element comprising a ring structure, wherein each of the plurality of dividing bodies is coupled to the ring structure of the central junction element at the first coupling location.

Embodiment 10

Device according to embodiment 9, wherein the first coupling location is adjustable along the ring structure, for example by means of a first slidable coupling.

Embodiment 11

Device according to embodiment 9 or 10, the ring structure comprising a first rigid ring element and a second elastic ring element which is positioned, e.g. concentrically, inside the former, wherein each of the plurality of dividing bodies is coupled to at least the second elastic ring element at the first coupling location, and is preferably coupled to the first rigid ring element and to the second elastic ring element at the first coupling location, for example by means of a first slidable coupling.

Embodiment 12

Device according to one of the preceding embodiments, comprising a connecting means for connecting a rubbish bag to the device.

Embodiment 13

Device according to one of embodiments 9-12, comprising a plug element which is configured to be fitted, in use, through the ring structure of the junction element, wherein a periphery of the plug element substantially corresponds to a periphery of the ring structure.

Embodiment 14

Device according to embodiment 13, comprising an odorizing element, wherein the odorizing element is provided in and/or on the plug element.

Embodiment 15

Device according to one of the preceding embodiments, wherein the device comprises an indicator for indicating the respective compartments.

The invention claimed is:

1. A device for compartmentalizing a container into several waste compartments, comprising:
- an attachment means, which is configured to be attached to an edge of the container, which edge defines an access to a space for holding waste, and
- a plurality of dividing bodies, wherein each dividing body of the plurality of dividing bodies is configured, in use, to extend inside the edge of the container in order to divide the access into a first opening of a first compartment and at least one second opening of a second compartment,
- wherein each dividing body of the plurality of dividing bodies is attachable to the edge of the container by means of the attachment means,
- wherein the dividing bodies and the attachment means are at least partly flexible in order to be adjustable between a first, relatively compact, position of the device and at least one further, extended, position of the device,
- wherein the attachment means comprises a peripheral element, which peripheral element is configured to be provided, in use, around the access to the container,
- wherein the peripheral element is at least partly elastic in order to vary the length of the periphery of the peripheral element,
- wherein each dividing body of the plurality of dividing bodies is at least partly elastic in order to vary a length of the dividing body,
- wherein the device comprises a central junction element,
- wherein each dividing body of the plurality of dividing bodies extends between a first coupling location where the dividing body is coupled to the central junction element and a second coupling location where the dividing body is coupled to the peripheral element,
- wherein the central junction element comprises a ring structure, wherein each dividing body of the plurality of dividing bodies is coupled to the ring structure of the central junction element at the first coupling location,
- wherein the ring structure comprises a first rigid ring element and a second elastic ring element which is positioned inside the first rigid ring element, and
- wherein each dividing body of the plurality of dividing bodies is coupled to the first rigid ring element and to the second elastic ring element at the first coupling location.

2. The device according to claim 1, wherein the peripheral element comprises an adjustment means for adjusting the periphery of the peripheral element between a first peripheral dimension and a second, larger peripheral dimension.

3. The device according to claim 1, wherein the peripheral element comprises an elastic belt, which is configured to be clamped elastically around the access to the container.

4. The device according to claim 1, comprising a connecting means for connecting one or more rubbish bags to the device.

5. The device according to claim 1, wherein the second coupling location is adjustable along the peripheral element.

6. The device according to claim 5, wherein each of the dividing bodies comprises a second slidable coupling, which is connected to the peripheral element at the second coupling location,
- wherein each second slidable coupling comprises an engagement part, and
- wherein the peripheral element extends through each of the engagement parts.

7. The device according to claim 1, wherein the first coupling location is adjustable along the ring structure.

8. The device according to claim 7, wherein each of the dividing bodies comprises a first slidable coupling, which is connected to the ring structure at the first coupling location,
- wherein each first slidable coupling comprises a loop, and
- wherein the ring structure extends through each of the loops.

9. The device according to claim 8, wherein the first rigid ring element and the second elastic ring element extend through each of the loops.

10. The device according to claim 1, comprising a plug element which is configured to be fitted, in use, through the ring structure of the junction element, wherein a periphery of the plug element substantially corresponds to a periphery of the ring structure.

11. The device according to claim 1, comprising an odorizing element, wherein the odorizing element is provided in and/or on the plug element.

12. The device according to claim 10, wherein the indicator is, in use, arranged at a top surface of the plug element.

13. The device according to claim 1, wherein the device comprises an indicator for indicating the respective compartments.

14. A waste assembly for holding multiple different types of waste materials, comprising:
- a container comprising a container body with a bottom and a peripheral wall which extends between the bottom and an edge, wherein the bottom and the peripheral wall define an internal space of the container for holding waste, wherein the edge of the peripheral wall defines an access opening which gives access to the internal space, and
- a device according to claim 1,
- wherein the peripheral element of the device is provided around the access opening to the container,
- wherein the dividing body extends inside the access opening of the container in order to divide the access opening into a first opening of a first compartment and at least one second opening of a second compartment.

15. The waste assembly according to claim 14, wherein the plurality of dividing bodies extend laterally in a plane of the access opening between the junction element, which is centrally positioned in the access opening and the peripheral element,
- wherein a compartment is defined between each pair of adjacent dividing bodies, respectively.

16. The waste assembly according to claim 14, further comprising at least one bag,
- wherein, in use, the at least one bag is provided in one of the compartments, and
- wherein the bag, on an open side thereof, is connected to the device and/or to the container body.

17. A method of installing a device for compartmentalizing a container according to claim 1, comprising an at least partly elastic peripheral element and a plurality of at least partly elastic dividing bodies, in a container comprising the steps of:

setting a perimeter of the peripheral element to correspond to a perimeter of an edge of the container, which edge defines an access to a space for holding waste, attaching the peripheral element of the device around the access to the container, and adjusting positions of respective coupling locations between each of the dividing bodies and the peripheral element to obtain respective openings to compartments in the container, defined by the dividing bodies and the edge of the container.

18. A device for compartmentalizing a container into several waste compartments, comprising:

an attachment means, which is configured to be attached to an edge of the container, which edge defines an access to a space for holding waste, and a dividing body, which is configured, in use, to extend inside the edge of the container in order to divide the access into a first opening of a first compartment and at least one second opening of a second compartment, wherein the dividing body is attachable to the edge of the container by means of the attachment means, wherein the dividing body and the attachment means is at least partly flexible in order to be adjustable between a first, relatively compact, position of the device and at least one further, extended, position of the device, wherein the attachment means comprises a peripheral element, which peripheral element is configured to be provided, in use, around the access to the container, wherein the peripheral element is at least partly elastic in order to vary the length of the periphery of the peripheral element, wherein the dividing body is at least partly elastic in order to vary a length of the dividing body, wherein the peripheral element comprises an elastic belt, which is configured to be clamped elastically around the access to the container, wherein the connecting means comprises a clamping strip, which is, in use, arranged around the elastic belt, and wherein the clamping strip is configured to clamp one or more rubbish bags against the elastic belt.

* * * * *